United States Patent
Ladd et al.

(10) Patent No.: US 8,558,738 B2
(45) Date of Patent: Oct. 15, 2013

(54) GNSS RECEIVER USING SIGNALS OF OPPORTUNITY AND ASSISTANCE INFORMATION TO REDUCE THE TIME TO FIRST FIX

(75) Inventors: Jonathan Ladd, Bridgewater, NH (US); Patrick C. Fenton, Calgary (CA)

(73) Assignee: NovAtel Inc., Calgary (CA)

( * ) Notice: Subject to any disclaimer, the term of this patent is extended or adjusted under 35 U.S.C. 154(b) by 482 days.

(21) Appl. No.: 12/471,046

(22) Filed: May 22, 2009

(65) Prior Publication Data

US 2009/0322601 A1     Dec. 31, 2009

Related U.S. Application Data

(60) Provisional application No. 61/055,189, filed on May 22, 2008.

(51) Int. Cl.
*G01S 19/23* (2010.01)
*G01S 19/24* (2010.01)
*G01S 19/26* (2010.01)
*G01S 19/31* (2010.01)

(52) U.S. Cl.
USPC ............ 342/357.62; 342/357.63; 342/357.65; 342/357.71

(58) Field of Classification Search
USPC ............ 342/347.42, 357.49, 357.62, 357.63, 342/357.64, 357.65, 345.68, 357.71, 357.73
See application file for complete search history.

(56) References Cited

U.S. PATENT DOCUMENTS

| 3,742,498 | A | 6/1973 | Dunn |
| --- | --- | --- | --- |
| 3,787,862 | A | 1/1974 | Jacobson |
| 5,663,735 | A | 9/1997 | Eshenbach |
| 5,786,773 | A | 7/1998 | Murphy |
| 5,945,948 | A | 8/1999 | Buford et al. |
| 6,178,195 | B1 * | 1/2001 | Durboraw et al. ............ 375/136 |
| 6,212,475 | B1 | 4/2001 | France et al. |
| 6,492,945 | B2 | 12/2002 | Counselman, III et al. |

(Continued)

FOREIGN PATENT DOCUMENTS

| CA | 2398781 | 5/2002 |
| --- | --- | --- |
| EP | 0747721 | 12/1996 |

(Continued)

OTHER PUBLICATIONS

Hui Tian et al.: "Signals of opportunity assisted ubiquitous geolocation and navigation technology", Proceedings of SPIE, vol. 7144, Jan. 1, 2008, pp. 714439-714439-11.

*Primary Examiner* — Cassie Galt
(74) *Attorney, Agent, or Firm* — Cesari and McKenna, LLP; Patricia A. Sheehan

(57) ABSTRACT

A GNSS receiver reduces the time to first fix by utilizing the properties of existing radiated signals of opportunity, such as AM or FM radio signals, television signals and so forth, to reduce the uncertainties associated with oscillator frequency and phase, and further utilizing an Almanac and battery backed-up date and time to determine the satellites in view and reduce the uncertainties associated with Doppler. The receiver may use multiple signals of opportunity to determine the city or local area in which the receiver is located based on the set of frequencies of the signals, and also to reduce search uncertainties for oscillator frequency by estimating an offset based on the differences between the frequencies of the respective signals of opportunity at the receiver and the nominal broadcast frequencies of the signals.

23 Claims, 2 Drawing Sheets

(56) References Cited

U.S. PATENT DOCUMENTS

| | | | |
|---|---|---|---|
| 6,556,942 B1 | 4/2003 | Smith | |
| 6,560,535 B2 | 5/2003 | Levy et al. | |
| 6,816,111 B2* | 11/2004 | Krasner | 342/357.62 |
| 6,965,754 B2* | 11/2005 | King | 455/12.1 |
| 7,053,824 B2* | 5/2006 | Abraham | 342/357.64 |
| 7,405,694 B1 | 7/2008 | Hwang et al. | |
| 7,511,662 B2 | 3/2009 | Mathews et al. | |
| 7,511,667 B2 | 3/2009 | Matsuoka et al. | |
| 7,528,771 B2* | 5/2009 | Kishimoto et al. | 342/357.62 |
| 7,576,690 B2 | 8/2009 | Vollath | |
| 7,602,334 B1* | 10/2009 | Lorenz | 342/357.29 |
| 7,620,403 B2* | 11/2009 | Korneluk et al. | 455/456.1 |
| 2001/0009563 A1 | 7/2001 | Kohli et al. | |
| 2001/0050633 A1 | 12/2001 | Thomas | |
| 2003/0058163 A1 | 3/2003 | Zimmerman et al. | |
| 2003/0068977 A1 | 4/2003 | King | |
| 2003/0072356 A1 | 4/2003 | Abraham et al. | |
| 2003/0085839 A1 | 5/2003 | Zhodzishky et al. | |
| 2003/0201935 A1* | 10/2003 | King et al. | 342/357.15 |
| 2004/0130485 A1 | 7/2004 | Rapoport et al. | |
| 2004/0207556 A1 | 10/2004 | Spilker et al. | |
| 2005/0057395 A1 | 3/2005 | Atkinson et al. | |
| 2005/0197769 A1 | 9/2005 | Sochren et al. | |
| 2005/0201421 A1 | 9/2005 | Bhandari et al. | |
| 2007/0050824 A1 | 3/2007 | Lee et al. | |
| 2007/0182633 A1 | 8/2007 | Omura et al. | |
| 2007/0216575 A1 | 9/2007 | DiEsposti | |
| 2007/0241960 A1 | 10/2007 | Feller | |
| 2007/0282565 A1 | 12/2007 | Bye et al. | |
| 2008/0039116 A1* | 2/2008 | Abraham | 455/456.1 |
| 2009/0011779 A1* | 1/2009 | MacNaughtan et al. | 455/456.6 |
| 2009/0256750 A1 | 10/2009 | Mathews et al. | |

FOREIGN PATENT DOCUMENTS

| | | |
|---|---|---|
| EP | 1254545 | 10/2007 |
| GB | 2353648 | 2/2001 |
| WO | WO 97/28455 | 8/1997 |
| WO | WO 99/48233 | 9/1999 |

* cited by examiner

GNSS RECEIVER USING SIGNALS OF OPPORTUNITY AND ASSISTANCE INFORMATION TO REDUCE THE TIME TO FIRST FIX

CROSS-REFERENCE TO RELATED APPLICATIONS

The present application claims the benefit of U.S. Provisional Patent Application Ser. No. 61/055,189, which was filed on May 22, 2008, by Jonathan Ladd and Ptrick Fenton for a GNSS RECEIVER USING SIGNALS OF OPPORTUNITY AND ASSISTANCE INFORMATION TO REDUCE THE TIME TO FIRST FIX and is hereby incorporated by reference.

BACKGROUND OF THE INVENTION

1. Field of the Invention

The invention relates generally to GNSS receivers and methods of operating the GNSS receivers to reduce both time to first fix and receiver radio frequency (RF) bandwidth.

2. Background Information

When acquiring GNSS satellite signals, receivers perform searches that involve uncertainties related to satellite selection, Doppler frequency and receiver oscillator frequency. Generally, the search involves cycling through all possible satellite selections, and for each satellite successively trying possible frequencies and code phase delays in an attempt to obtain frequency and code lock with the satellite signal. At each combination of frequency and code phase delay, the receiver determines correlation power to check if the satellite signal has been acquired. the process must be performed for each satellite in the search strategy, since each satellite transmits a unique code and is associated with a different relative motive with respect to the receiver. This exhaustive search is thus time consuming.

The uncertainties related to satellite selection could be solved by use of a valid Almanac of orbiting satellites, the true time of day from a clock driven by the receiver oscillator, and an approximate location of the receiver. From the Almanac, the time and the position information, the receiver can determine the satellites in view and compute their expected Doppler frequency offsets. However most receivers, after a power down cycle, do not maintain a valid position or a sufficiently accurate time. Without the Almanac, accurate time and also a valid position, the receiver must cycle through all possible satellites in its search strategy, as discussed above. Even with the Almanac, and sufficiently accurate time and position information, the search is still subject to clock frequency uncertainties, which makes even a more limited search strategy time consuming. Further, if the receiver has moved during power down, the retained position may no longer be sufficiently valid for the computation of satellites in view and/or expected Doppler frequency.

The uncertainties related to Doppler frequency and receiver oscillator frequency require that the searches are extended by ±4 kHz for Doppler and ±12 kHz for oscillator frequency. The magnitude of the oscillator frequency uncertainty is a function of the type of oscillator or timing crystal used in the receiver. The more precise (and usually more costly) the oscillator is, the less uncertainty there is in its generated frequency. The typical oscillators used in GNSS receivers have between 5 to 10 parts per million (ppm) frequency uncertainty due to temperature and aging affects, and 10 ppm equates to additional ±16 kHz Doppler uncertainty.

Contending with either or both of the Doppler and oscillator frequency and phase uncertainties results in a longer time to first fix (TTFF), which is the time required by a GNSS receiver to achieve a position solution and typically involves acquiring and tracking the signals from at least four GNSS satellites. The oscillator frequency uncertainty further requires a wider radio frequency (RF) bandwidth for tracking, which adversely affects the tracking of weaker satellite signals due to increased susceptibility to RF interfering signals.

To reduce the TTFF, known prior GPS receivers, such as the receiver described in U.S. Pat. No. 5,663,735 to Eshenbach, may utilize data that are modulated onto special purpose radio signals, such as, for example, time announcements that are modulated onto National Institute of Standards and Technology (NIST) radio signals. The GPS receivers utilize the time announcements to determine a transition time between two data bits modulated onto a GPS satellite signal that is being acquired and, in turn, determine GPS time. Further, the GPS receivers may also use frequency information that is modulated onto the NIST radio signal to remove the uncertainty in the receiver oscillator frequency, although the phase uncertainties of the oscillator driven clock remain. One of the problems with such GPS receivers, however, is that the NIST radio signals may not be available at certain locations. Further, even if NIST radio signals are available, the content modulated onto the signals does not provide information that the GPS receiver can use directly to estimate its location.

SUMMARY OF THE INVENTION

A GNSS receiver utilizes the properties of existing radiated signals of opportunity, such as AM or FM radio signals, television signals and so forth, to reduce the uncertainties associated with oscillator frequency and the oscillator driven clock phase uncertainty. Further, the GNSS receiver utilizes assistance in the form of a stored Almanac orbiting satellite and battery backed-up date and time, to reduce the uncertainties associated with Doppler.

The GNSS receiver may also use the properties of multiple signals of opportunity to determine the city or local area in which the receiver is located in order to provide a sufficiently accurate position estimate (to within 100 kilometers) to enable the use of the Almanac. The receiver may, for example, determine the city or local area based on the set of signal frequencies, as discussed in more detail below.

Once the city or local area in which the GNSS receiver is located is known, the GNSS receiver may use the nominal or published frequencies of the local signals of opportunity to determine an estimate of oscillator frequency offset. The GNSS receiver thus determines the difference between the frequency of a signal of opportunity at the remote receiver and the nominal frequency of the signal of opportunity, and uses the difference as an estimate of the oscillator frequency offset, to eliminate or at least substantially reduce the associated ±12 kHz search uncertainty.

In addition, the GNSS receiver may use the city or area location information and the stored time and date to enter the stored Almanac, and determine the satellites in view thereby reducing the exhaustive satellite search to searching only for the satellites currently visible. Further, the receiver can also compute associated estimated Doppler offsets, to eliminate or at least substantially reduce the ±4 kHz search extension for Doppler.

The time to first fix (TTFF) is thus reduced considerably, since the receiver is searching only for visible satillites, and the search windows need no longer accommodate the large uncertainties associated with Doppler and oscillator frequency.

When tracking, the GNSS receiver may phase lock to the carrier of the signal of opportunity, and use the radio or television station clock to stabilize the receiver oscillator. The GNSS receiver can then use a narrower band during tracking, which allows the receiver to track weaker GNSS signals.

The GNSS receiver may be included in a system that utilizes a base GNSS receiver which has a known position and sufficiently clear view of the sky over at least a substantial portion of a local area. The base GNSS receiver may provide navigation message data and data symbol boundary information to the remote receiver. The remote receiver utilizes the data and boundary information to perform data "wiping," which allows use of longer integration periods during acquisition, and thus, acquisition of weaker satellite signals. In addition, the base GNSS receiver may provide the city or local area information to the remote GNSS receiver as assistance information, and the GNSS receiver can then determine which signals of opportunity are in the area, and/or use the information along with the stored time and date to enter the Almanac. The base receiver may also provide more precise broadcast frequencies of the local signals of opportunity and/or locations of the transmitters to the remote receivers for improved performance.

BRIEF DESCRIPTION OF THE DRAWINGS

The invention description below refers to the accompanying drawings, of which.

DETAILED DESCRIPTION OF AN
ILLUSTRATIVE EMBODIMENT

Figure 1:
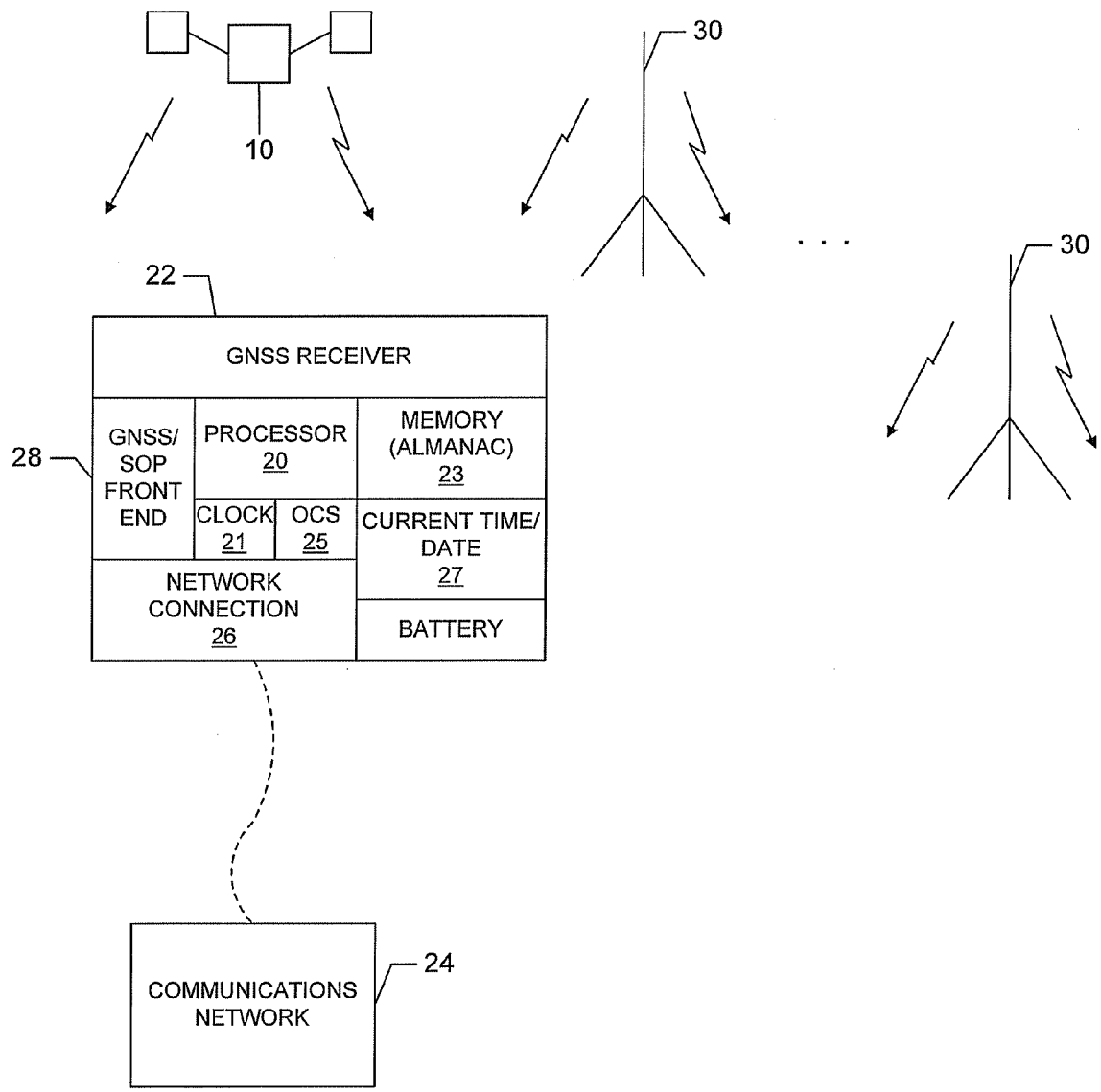
FIG. 1 is a functional block diagram of a GNSS receiver constructed in accordance with the invention.

Referring to FIG. 1, a remote GNSS receiver 22 is illustrated connected to a communication network 24, such as, for example, the internet or a private network, through a connection 26, which may be wired (indicated by dotted line) or wireless. The remote receiver includes one or more processors 20, an oscillator 25 and an oscillator driven time of day clock 21 that perform GNSS signal acquisition and tracking and provide position solutions in a known manner. In addition, the remote receiver includes a battery-backed real time clock (RTC) 27 that maintains the current time and date during power down cycles and a memory 23 that contains an Almanac of GNSS satellite information. The real time clock, which operates in a known manner utilizing a low power oscillator and low power timing keeping logic, maintains the current time and date during power down cycles utilizing relatively little battery power. The Almanac, which is good for approximately 1 year without updating, and the current time and date are utilized to reduce the time to first fix, as discussed in more detail below.

The remote receiver 22 includes a radio frequency (RF) front end 28 that receives signals from GNSS satellites, represented collectively by reference numeral 10 in the drawing, and also receives signals broadcast from multiple high power radiators such as local radio and television station transmitters, Beacon or Loran transmitters, and so forth, which are represented collectively by reference numeral 30 in the drawing. The broadcast signals, which are selected due to their quality of signal, known transmission locations, and continuous broadcast, are "signals of opportunity," that is, signals that are broadcast at various frequencies and for purposes such as the transmission of random conversation or dialog. This is in contrast to GNSS signals, for example, which are broadcast at the same frequencies by the GNSS satellites and carry particular codes. Further, in contrast to known systems, the current system utilizes properties of the signals of opportunity and does not utilize the data or content of information modulated onto the broadcast signals. The current system does not, for example, utilize transmitted time of day information contained in the broadcast signals. The high-power radiators 30 are referred to hereinafter as the "SOP transmitters."

The remote receiver 22 may utilize the signals of opportunity directly to determine in which city or area the receiver is located. The remote receiver thus scans for the signals of opportunity and then checks which city or local area has, for example, radio and television transmitters that are transmitting using the same set of frequencies.

The locations of the SOP transmitters 30 are usually known or can be readily determined from the information provided by a registration authority, such as, for example, the U.S. Federal Communications Commission or FCC. The information may be available, for example, over the internet or the private network 24 or retained in memory 23 as part of stored area maps. The network 24 may also provide the remote receiver with a list of usable local signals of opportunity, or the receiver may select particular signals of opportunity, for example, based on the field strengths of the signals at the receiver, and/or the stability of the carrier frequencies, and so forth. Alternatively, the list of usable local signals of opportunity may be supplied to the receiver by a user over a user interface (not shown), such as, for example, a keyboard or screen. Similarly, the user may supply the locations of the signal of opportunity transmitters to the receiver over the user interface. In addition or in the alternative, the user may provide the receiver with the city or local area of operation.

Notably, the broadcast signals are of sufficiently low frequency and higher signal power to have excellent building penetration. Thus, the remote receiver need not have a particularly good view of the sky, but instead must have relatively good reception of the selected broadcast signals of opportunity. Further, the use of such low frequency signals allows the receivers to scan with configurable front end filters, such as charged capacitor filters or digital FIR filters, to find the best signal of opportunity candidates.

Once the remote receiver 22 has determined a city or local area, and thus, an approximate location to within at least 100 kilometers, the remote receiver may use the stored almanac and the stored time and date information to determine which satellites are then in view and also estimate satellite Doppler frequency offsets. This eliminates or substantially reduces the associated ±4 kHz uncertainty in searching for the GNSS satellite signals.

The remote receiver may also utilize the signals of opportunity to reduce the ±12 kHz uncertainty associated with oscillator frequency offset. The receiver thus determines the difference between the frequency to which it tunes to receive a strong signal of opportunity and the nominal, or published, frequency of the signal of opportunity. One of the signals of opportunity may, for example, be a radio station that nominally transmits at 1030 kHz, and the receiver may tune to a frequency that differs slightly to receive the signal. The receiver then uses the difference between the received and nominal frequencies as an estimated receiver oscillator frequency error or offset. The receiver may also do the same for other local strong signals of opportunity and, based on the average difference between the respective frequencies at the receiver and the nominal frequencies, estimate its oscillator frequency offset. The estimated offset can then be used to essentially eliminate the associated ±12 kHz search window extension typically associated with unknown oscillator offsets, though a time of day clock phase uncertainty still exists.

The remote receiver can thus significantly reduce its time to first fix (TTFF) using the stored Almanac and time and date information, and the oscillator frequency offset of the estimates that are based on local signals of opportunity.

The remote receiver 22 can also phase lock to the carrier of a local radio or television signal of opportunity, and use the radio or television station clock to stabilize the receiver oscillator 25. For example, the remote receiver may use the zero crossings or timing pulses of the television signals to stabilize the receiver oscillator. The receiver can then use a narrower band tracking loop to track weaker GNSS signals, since the signal-to-noise ratio increases with the use of the narrower band. Further, the receiver may utilize an inexpensive oscillator and still achieve improved tracking, by remaining phase locked to the local signal of opportunity.

Figure 2:
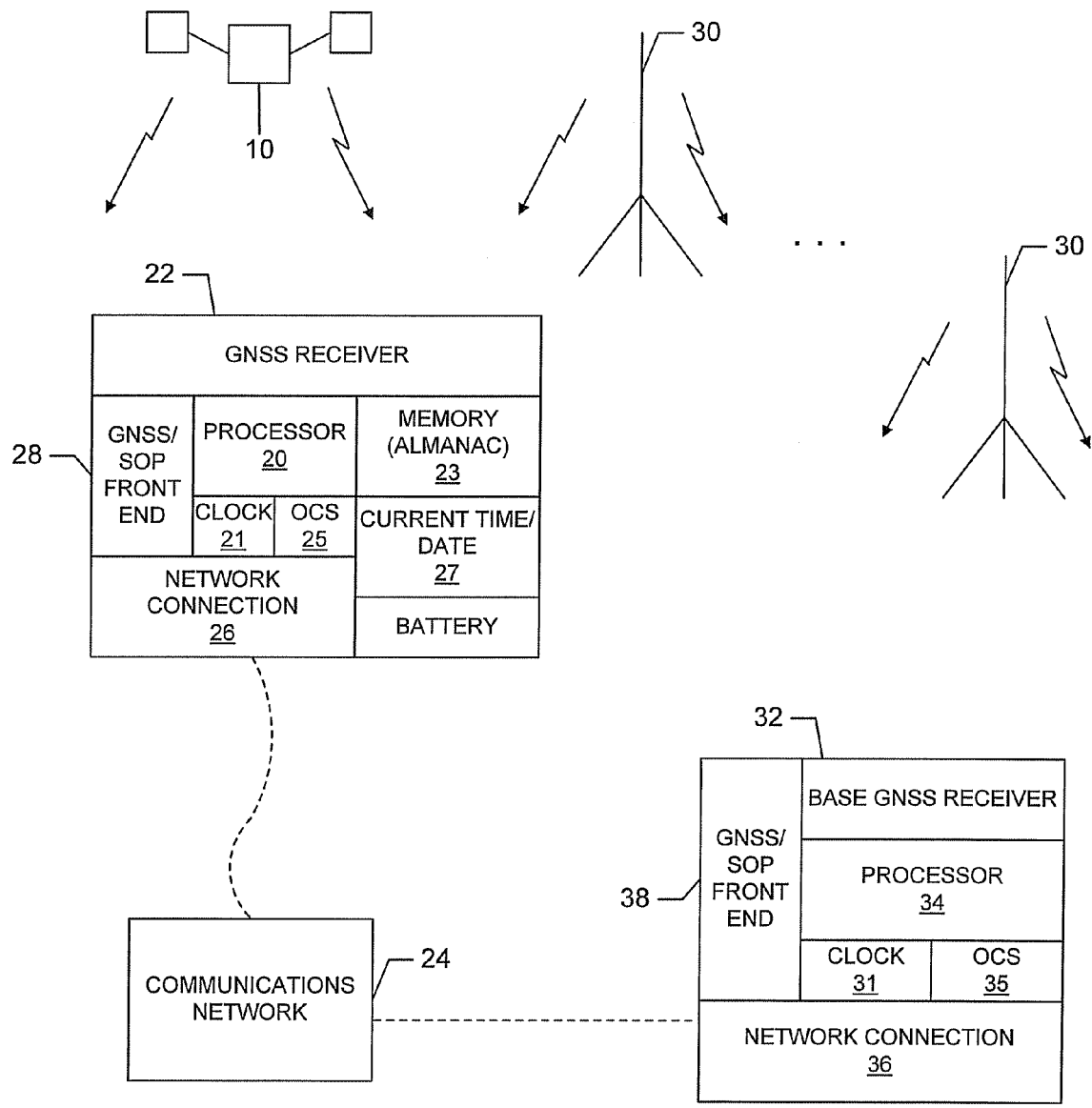
FIG. 2 is a functional block diagram of a system constructed in accordance with the invention.

Referring now to FIG. 2, a system for use with the remote receiver 22 includes a base GNSS receiver 32 that has a clear view of the sky over at least a portion of the area covered by the system and can readily acquire and track GNSS satellite signals. The base receiver has a known position, determined either from the GNSS satellite signals in view or, alternatively, during installation by, for example, a hand-held GPS unit, a survey and/or through use of topological maps. The base receiver acquires and tracks the signals from the GNSS satellites in view and may provide GNSS time and/or frequency information to the remote receiver, to assist the remote receiver in reducing TTFF. The base GNSS receiver is shown in the drawing connected to the communications network 24. Alternatively, the base receiver 32 may be configured to transmit signals directly to and/or receive signals directly from the receiver 22.

Alternatively or in addition, the base GNSS receiver 32, with its oscillator synchronized to GNSS frequency, may measure the exact broadcast frequencies of the signals of opportunity and transmit the carrier frequencies to the remote GPS receiver 22 either directly or over the communications network 24. Using the frequency information, the remote receiver can more precisely control the frequency of its oscillator by phase locking to the exact broadcast frequency of a strong signal of opportunity.

Further, the use of the precise frequencies eliminates an associated Doppler frequency uncertainty. Typically the AM/FM stations broadcast signals of opportunity at frequencies that are within a 1 or 2 parts per million offset of their nominal broadcast allotted frequency. A 2 parts per million broadcast frequency error will result in a ±3 kHz Doppler frequency uncertainty for acquiring GNSS signals, and the use of the precise frequencies as determined by the GNSS base station eliminates this uncertainty.

In addition, the base GPS receiver 32 may supply the Almanac to the remote receiver 22, such that the remote receiver need not maintain the Almanac during power down cycles. Also, the base GNSS receiver may provide to the remote receiver navigation messages and the data symbol boundaries for the respective GNSS satellites in view. The data symbol boundaries are the times at which the data symbols in the navigation message are transmitted by the GNSS satellites. Using the data symbols and the symbol boundary information, the remote receiver can "wipe" the data off of the received satellite signals, that is, the receiver can compensate for the corresponding phase changes during correlation operations. The wiping allows the remote receiver to integrate correlation measurements over longer periods, that is, integrate beyond the data symbol boundary times. The receiver can thus acquire weaker GNSS signals, such as signals that are weakened by multipath or are partially blocked by buildings or foliage.

Also, the navigation messages may be made available to the remote receiver at an earlier time than the receiver can obtain the messages from the GNSS satellite signals, and this allows the remote receiver to more accurately determine the locations of the GNSS satellites that are required to compute the position solution during the TTFF. Using the navigational messages, the remote receiver can generally compute more accurate satellite locations than the receiver can compute using the information from the Almanac.

The remote receiver 22 may also, or instead, utilize assistance information provided by the base receiver 32 in the form of satellites in view, ephemeris information, Doppler offsets, and so forth, to quickly determine position to within 150 meters based on received GNSS signals and/or one or more signals of opportunity. Using the assistance information, the remote receiver need not then take the time to use the Almanac. The remote receiver may also determine time of day to within at least several microseconds based on the RTC time and date information and using the properties of the signals of opportunity. Accordingly, the remote receiver may, in addition to determining its oscillator clock frequency offset as described, determine it's the phase offset of its clock 21 and preposition its PRN code search based upon the known times of code chip transmissions from the GNSS satellites. The code search prepositioning reduces the code search from, for example, 1000 code chips to 10 code chips, thereby reducing the time it takes to perform the search. The code search prepositioning is particularly useful for longer PRN codes.

The GNSS receiver and system described herein have the advantage of reducing TTFF by utilizing RTC time and, date, and as appropriate Almanac information, along with the properties of broadcast signals of opportunity and the known locations of the SOP transmitters. The known locations of the SOP transmitters may be trajectories rather than fixed locations. For example, an SOP transmitter may transmit from a moving platform such as an automobile, aircraft, ship or satellite, provided that the location and the velocity vector of the transmitter can be determined by the system. For a satellite transmitter, for example, the orbital ephemeris parameters must be readily available. The remote receivers may be mobile or fixed-position receivers.

The receiver's one or more processors may be configured as a single processor, the operations of determining position solutions and oscillator frequency offsets may be performed in hardware, software or firmware, and the remote and base receivers include the known hardware, software or firmware utilized to perform the acquisition and tracking operations, including the hardware, software or firmware to make correlation measurements, produce local codes and so forth. The processors may be programmed to perform the operations and/or operate hardware, and so forth, with the programs provided as computer executable instructions on computer readable media. The RTC may be replaced by other known mechanisms that maintain time and date during power down cycles. The RTC or mechanism may alternatively or in addition be powered by alternative energy sources, such as, for example, a large capacitor.

What is claimed is:

1. A GNSS receiver including:
   a radio frequency front end for receiving GNSS satellite signals and signals of opportunity, which contain random content, the radio frequency front end including one ore more configurable front end filters that scan broadcast signals to tune to signals of opportunity;
an oscillator used for acquiring and tracking the GNSS satellite signals; and
one or more processors configured to
process selected signals of opportunity and estimate a frequency offset for the oscillator based on a difference between the frequencies of one or more of the selected signals of opportunity as determined by the front end and nominal broadcast frequencies of the one or more selected signals of opportunity, and
use the estimated oscillator frequency offset to reduce a search window for acquiring the GNSS satellite signals.

2. The GNSS receiver of claim 1 wherein the one or more processors further determine an estimated location of the receiver based on the broadcast frequencies of multiple signals of opportunity and signal of opportunity transmitter location information.

3. The GNSS receiver of claim 1 further including
a real time clock that maintains current time and date,
a memory for storing an Almanac, and
the one or more processors determine satellites in view and estimate Doppler offsets associated with signals from the satellites in view based on an estimated location of the receiver, the stored Almanac and the current time and date and utilize the estimated Doppler offsets to further reduce the search window.

4. The GNSS receiver of claim 3 wherein the one or more processors determine the estimated location of the receiver based on the broadcast frequencies of multiple signals of opportunity and signal of opportunity transmitter location information.

5. The GNSS receiver of claim 4 further including a connection to a communications network, the network providing the signal of opportunity transmitter location information to the receiver over the connection.

6. The GNSS receiver of claim 5 wherein the receiver selects the signals of opportunity from a list of usable signals of opportunity.

7. The GNSS receiver of claim 5 wherein the network connection provides access to the internet.

8. The GNSS receiver of claim 1 wherein the one or more processors phase lock the oscillator used for signal acquisition and tracking to one of the signals of opportunity to provide narrow band tracking of the GNSS signals.

9. The GNSS receiver of claim 1 further including
a real time clock that maintains current time and date; and
the one or more processors are further configured to determine time to within several microseconds of GNSS time based on the maintained current time and a timing property of the signals of opportunity, and preposition code searching based on known times of code chip transmissions from GNSS satellites.

10. A GNSS receiver including:
a radio frequency front end for receiving GNSS satellite signals and signals of opportunity, which contain random content, the radio frequency front end including one or more configurable front end filters that scan broadcast signals to tune to signals of opportunity;
an oscillator for use in acquiring and tracking the GNSS satellite signals; and
one or more processors configured to
select one or more signals of opportunity, process the selected signals of opportunity and phase lock the oscillator to one of the selected signals of opportunity, and
use a narrowed band to track the GNSS satellite signals.

11. A system for reducing the time to first fix position, the system including:
a base GNSS receiver for acquiring and tracking GNSS satellite signals and providing assistance information;
a remote GNSS receiver with
a radio frequency front end for receiving GNSS satellite signals and signals of opportunity, which contain random content, the radio frequency front end including one or more configurable front end filters that scan broadcast signals to tune to signals of opportunity;
a network connection to receive assistance information from the base GNSS receiver;
an oscillator for use in acquiring and tracking the GNSS signals; and
one or more processors configured to
select one or more signals of opportunity, process the selected signals of opportunity and estimate a frequency offset for the oscillator based on a difference between the frequencies of one or more of the selected signals of opportunity as determined by the front end and broadcast frequencies of the one or more signals of opportunity, and
use the estimated oscillator frequency offset to reduce a search window for acquiring the GNSS satellite signals.

12. The system of claim 11 wherein the assistance information is the broadcast frequencies of the signals of opportunity.

13. The system of claim 12 wherein broadcast frequencies are determined by the base GNSS receiver when the base GNSS receiver is phase locked to a GNSS frequency.

14. The system of claim 12 wherein the broadcast frequencies are the nominal broadcast frequencies of the signals of opportunity.

15. The system of claim 11 wherein
the assistance information is the location of signal of opportunity transmitters, and
the one or more processors determine the estimated location of the receiver based on the broadcast frequencies of multiple signals of opportunity and signal of opportunity transmitter location information.

16. The system of claim 11 wherein
the assistance information is navigation messages and message bit timing, and
the one or more processors wipe the navigation messages from received GNSS satellite signals and use correlation intervals that span multiple message bits to acquire the GNSS satellite signals.

17. The system of claim 11 wherein
the assistance information includes one or more of a list of GNSS satellites in view, associated Doppler offsets, ephemeris information, and
the remote receiver uses the assistance information to reduce the search to satellites in view and further reduce the search window based on the Doppler offsets.

18. The system of claim 11 wherein the remote receiver further includes
a real time clock for maintaining current time and date; and
the one or more processors are further configured to determine time to within several microseconds of GNSS time based on the maintained current time and a timing property of the signals of opportunity, and preposition code searching based upon known times of code chip transmissions from GNSS satellites.

19. The system of claim 11 wherein
the assistance information includes current time and date, estimated city or area location information and an Almanac, and
the one or more processors determine satellites in view and associated estimated Doppler offsets using the assistance information and utilize the estimated offsets to reduce further reduce the search window.

20. The system of claim 16 wherein the one or more processors
phase lock an oscillator used in acquiring and tracking the GNSS signals to one of the signals of opportunity, and
narrow a band used to track the GNSS satellite signals.

21. The system of claim 11 wherein the network connection is wireless, wired or both.

22. The GNSS receiver of claim 1 wherein the one or more processors select the signals of opportunity based on one or more of field strength of the signals at the receiver and stability of the carrier frequency.

23. The GNSS receiver of claim 1 wherein the one or more configurable front end filters are one or more of charged capacitor filters and digital FIR filters.

* * * * *